United States Patent
Shimizu

[11] 3,734,600
[45] May 22, 1973

[54] FISHEYE LENS SYSTEMS

[75] Inventor: Yoshiyuki Shimizu, Kawasaki, Japan

[73] Assignee: Nippon Kogaku K.K., Tokyo, Japan

[22] Filed: Dec. 16, 1971

[21] Appl. No.: 208,639

[30] Foreign Application Priority Data
Dec. 24, 1970 Japan.............................45/116645

[52] U.S. Cl....................350/196, 350/216, 350/234
[51] Int. Cl...............................................G02b 9/60
[58] Field of Search....................350/216, 215, 214, 350/196

[56] References Cited

UNITED STATES PATENTS

| 3,601,473 | 8/1971 | Mandler | 350/215 |
| 3,497,291 | 2/1970 | Woltche | 350/215 |
| 3,524,697 | 8/1970 | Isshiki et al | 350/196 |

FOREIGN PATENTS OR APPLICATIONS 1,137,788  12/1968  Great Britain.........................350/215

*Primary Examiner*—John K. Corbin
*Attorney*—Joseph M. Fitzpatrick et al.

[57] ABSTRACT

A lens system comprises, in sequence moving from the object side, first and second negative meniscus lenses both convex to the object side, a biconvex lens, a negative meniscus lens cemented to the third lens, and fifth to eighth lenses including one or two negative lenses and cemented together so as to form two lens groups. An aperture stop is interposed between the fourth and fifth lenses. The lenses are arranged to satisfy predetermined conditions, thereby providing a fisheye lens system having a long back-focus two to three times greater than its focal length and yet having a compact construction.

4 Claims, 14 Drawing Figures

SPHERICAL ABERRATION
SINE CONDITION

ASTIGMATISM
SAGITAL
MERIDIONAL

DISTORTION

FIG. 5A
SPHERICAL ABERRATION ———
SINE CONDITION ------
F/2.8
g
F/4
d
-1.0  0  1.0
FIG. 5B
SAGITAL ———
ASTIGMATISM
MERIDIONAL ------
90°
-2.0  0  2.0
FIG. 5C
DISTORTION
90°
-100% 0
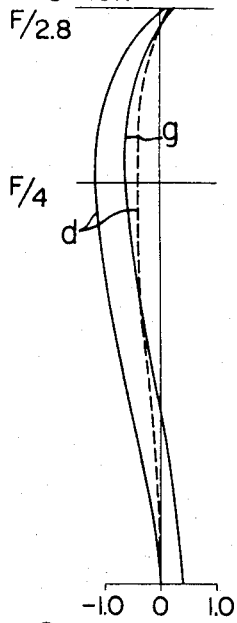
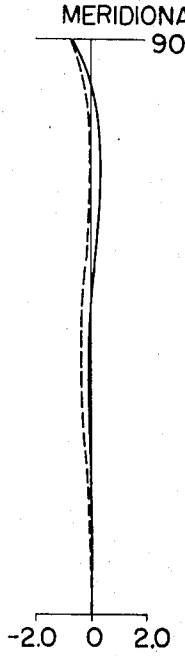
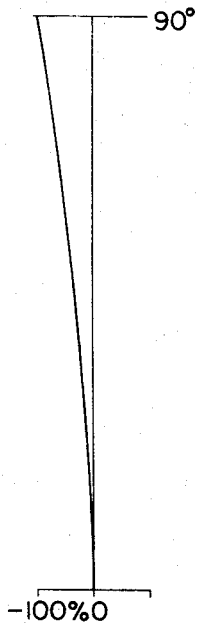
FIG. 6A
SPHERICAL ABERRATION ———
SINE CONDITION ------
F/2.8
d   g
F/4
-1.0  0  1.0
FIG. 6B
SAGITAL ———
ASTIGMATISM
MERIDIONAL ------
80°
-2.0  0  2.0
FIG. 6C
DISTORTION
80°
-100% 0
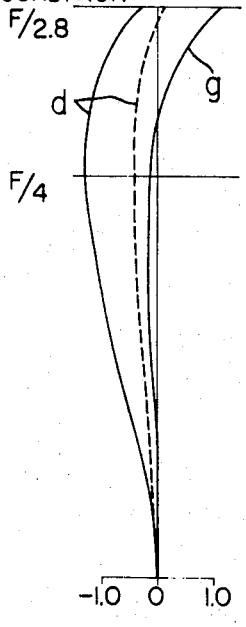
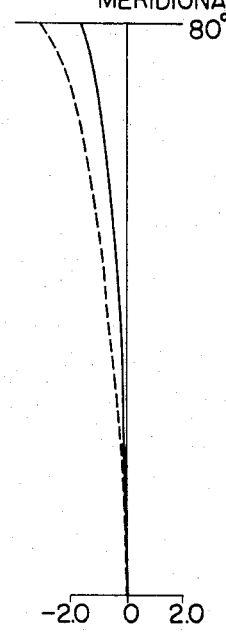
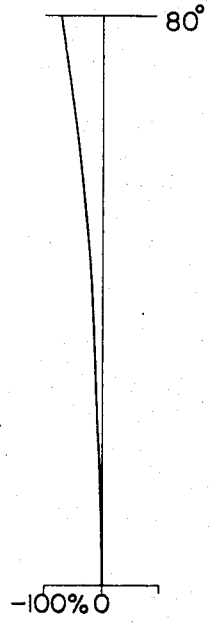

FISHEYE LENS SYSTEMS

BACKGROUND OF THE INVENTION

1. Field of the Invention

This invention relates to optical systems, and more particularly to a fisheye lens system having a long back-focus.

2. Description of the Prior Art

Conventional fisheye lens systems have been of relatively large dimension in relation to their respective focal lengths, and this has led to certain disadvantages in the practical use of same.

SUMMARY OF THE INVENTION

The present invention seeks to realize a compact optical system which has an aperture ratio of F/2.8 and also provides a back-focus which is two or more times longer than its focal length.

According to the present invention, there is provided a speed fisheye lens system which comprises, as viewed in the direction running from the object to the image, first and second negative meniscus lenses both convex to the object side of the system, a third lens which is biconvex, a fourth lens which is a negative meniscus lens cemented to the third lens, fifth to eighth lenses including one or two lens groups, and an aperture stop interposed between the fourth and fifth lenses. The lens system is arranged to satisfy certain conditions to be described, and provide a back-focus two to three times longer than its focal length.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein:

FIGS. 2(A), 2(B), 2(C), 4(A), 4(B), 4(C), 5(A), 5(B), 5(C), 6(A), 6(B), and 6(C) are graphs of various aberration curves in Examples I, II, III and IV of the present invention, wherein FIGS. 2(A), 4(A), 5(A) and 6(A) show the spherical aberration ($d$ and $g$ indicate curves for the wavelengths of $d$- and $g$-lines), FIGS. 2(B), 4(B), 5(B) and 6(B) show the astigmatism and FIGS. 2(C), 4(C), 5(C) and 6(C) show the distortional aberration.

DESCRIPTION OF THE PREFERRED EMBODIMENTS

Figure 1:
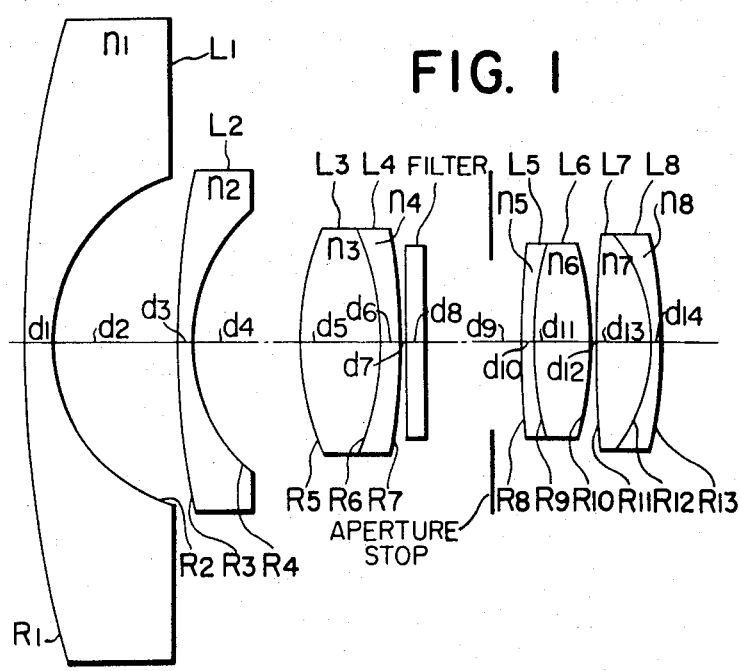
FIGS. 1 and 3 are longitudinal sections of Examples I and II of the present invention.
Figure 3:
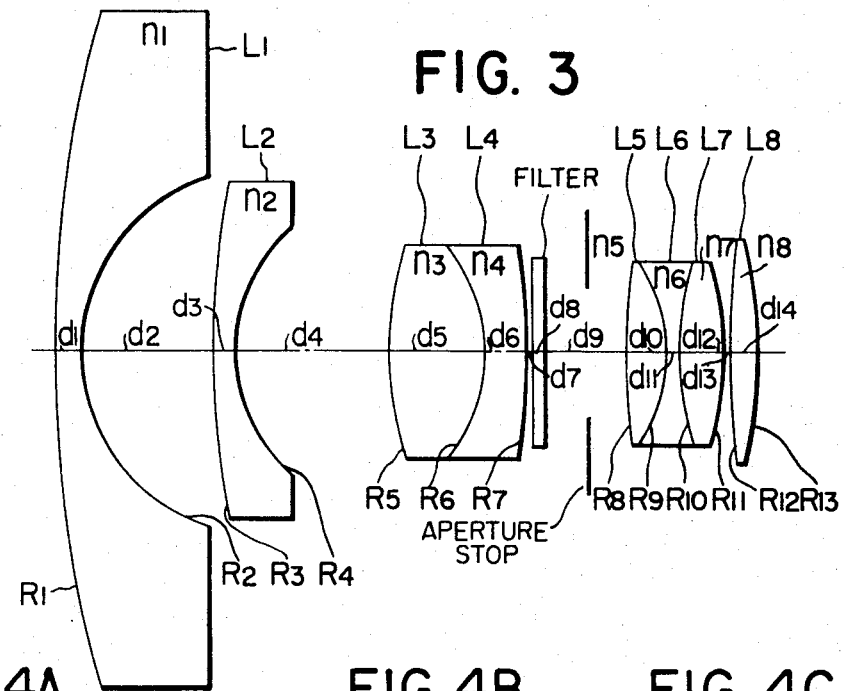

In FIGS. 1 or 3, as viewed from object to image, a first lens $L_1$ and a second lens $L_2$ are meniscus lenses of negative focal length with their convex surfaces facing toward the object. A third lens $L_3$ is a biconvex lens, to which is cemented a fourth lens $L_4$ which is a negative meniscus lens. The fourth lens $L_4$ is followed by fifth, sixth, seventh and eighth lenses $L_5$, $L_6$, $L_7$ and $L_8$, respectively, and an aperture stop is interposed between the lenses $L_4$ and $L_5$. A filter may further be interposed between the lens $L_4$ and the aperture stop. One or two of the four lenses $L_5$ to $L_8$ are negative lenses, and these last four lenses may be such that each two of them are cemented together to provide two lens groups as shown in FIG. 1, or that three of them are cemented together to divide the four lenses into two groups in the manner shown in FIG. 3.

Let the focal length of the entire lens system be $f$, the radius of curvature of the $i$th lens surface be $R_i$, the inter-vertex distance of the $i$th lens be $d_i$, the refractive index and the dispersive power of the $j$th lens $L_j$ be $n_j$ and $\nu_j$, respectively. According to the invention then, the lens system must satisfy the following relations:

$$3f < R_1 < 7f,\ 3f < R_3 < 7f \tag{1}$$

$$0.5f < R_2 < 2f,\ 0.5f < R_4 < 2f \tag{2}$$

$$R_7 < 0 \tag{3}$$

Also, let the mean value of the refractive indices and the mean value of the dispersive powers of the materials forming the concave lenses among the lenses $L_5$ to $L_8$ be $n_M$ and $\nu_M$, respectively, and the mean value of the refractive indices and the mean value of the dispersive powers of the materials forming the convex lenses among the lenses $L_5$ to $L_8$ be $n_P$ and $\nu_P$, respectively. Then the following relation must also be satisfied:

$$n_M > n_P$$
$$\nu_M < \nu_P \tag{4}$$

The significances of the foregoing conditions will now be described.

Condition (1) relates to the radii of curvature $R_1$ and $R_3$ in the object-facing surfaces of the lenses $L_1$ and $L_2$. If the values of $R_1$ and $R_3$ are lower than the lower limits of condition (1), the effective apertures of the lenses $L_1$ and $L_2$ will be greater. If the radii of curvature $R_1$ and $R_3$ exceed the upper limits of condition (1), light rays having wide angles of field will be incident on the object-facing surfaces of the lenses $L_1$ and $L_2$ at greater angles of incidence, thus resulting in an insufficient quantity of peripheral light. Thus, condition (1) is directed to reduce the dimensions of the lens system while securing a sufficient quantity of peripheral light.

Condition (2) is concerned with the radii of curvature $R_2$ and $R_4$ in the image-facing surfaces of the lenses $L_1$ and $L_2$. If the values of $R_2$ and $R_4$ are lower than the lower limits of this condition, off-axis rays incident with certain angles of field (i.e., rays incident at certain angles with the optical axis) will suffer from an excessive inner coma which cannot be corrected. Conversely, if the values of $R_2$ and $R_4$ exceed the upper limits of condition (2), it will become difficult to attain a long back-focus. Thus, condition (2) is intended to prevent occurrence of any excessive coma while maintaining a long back-focus.

Condition (3) deals with the radius of curvature $R_7$ in the image-facing surface of the lens $L_4$ and prescribes a negative value for the radius of curvature $R_7$. This condition is meant to correct the inner coma which may be produced in the off-axis rays incident on the lens $L_4$ at the angles of field provided by the image-facing surfaces of the preceding lenses $L_1$ and $L_2$. Since the aperture stop is located rearwardly from the lens $L_4$, such off-axis rays are subjected to greater refractions than the principal rays because of the limitations imposed upon the image-facing surface of the lens $L_4$ and the said refractions occur in the direction for correcting the inner coma. Thus, condition (3) is useful to correct the coma.

Finally, condition (4) is meant for the correction of astigmatism and this calls for a lower mean refractive index for the positive lenses than for the negative lenses in the lens groups succeeding to the aperture stop. This is effective to render the Petzval sum positive, and useful to correct the deviation of the Petzval sum of the lenses $L_1$ and $L_2$ toward the negative. Condition (4) also calls for a greater mean dispersive power for the positive lenses than for the negative lenses in the same lens groups, and this is useful to correct the axial chromatic aberration and the chromatic difference of magnification which results from the lenses $L_1$ and $L_2$.

Numerical data for the various examples of the present invention will be shown below. In the tables below, $R$ represents the radius of curvature, $\nu d$ the inter-vertex distance, $n$ the refractive index, and $\nu d$ the dispersive power. Although the arrangements of Examples I and II have been shown in FIGS. 1 and 3, those of Examples III and IV are omitted because they are similar to the arrangements of FIGS. 3 and 1, respectively.

Example I

Focal length $f=100.0$, Angle of field 180°, F/2.8, Back-focus 237.38

Figures 2A, 2B, 2C:
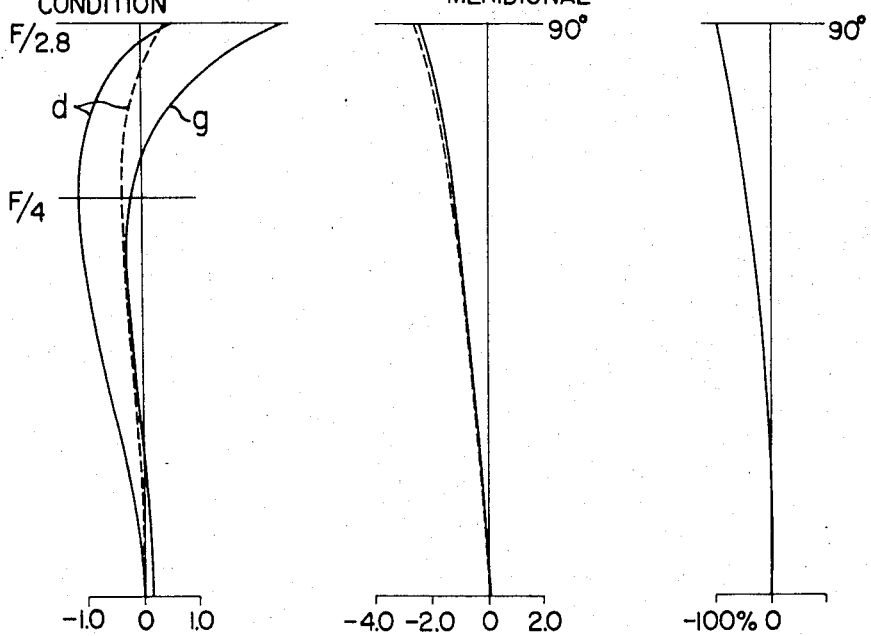

$R_1 = -581.25$
$R_2 = +92.375$
$R_3 = +546.875$
$R_4 = +95.625$
$R_5 = +143.75$
$R_6 = -133.313$
$R_7 = -321.313$
$R_8 = +3312.5$
$R_9 = +200.0$
$R_{10} = -173.75$
$R_{11} = +577.688$
$R_{12} = -80.625$
$R_{13} = -204.319$ $d_1 = 17.5$, $n_1 = 1.62041$, $\nu d = 60.3$
$d_2 = 70.0$
$d_3 = 11.25$, $n_2 = 1.62041$, $\nu d = 60.3$
$d_4 = 60.63$
$d_5 = 45.62$, $n_3 = 1.57501$, $\nu d = 41.3$
$d_6 = 10.0$, $n_4 = 1.77279$, $\nu d = 49.5$
$d_7 = 3.13$
$d_8 = 11.25$, Filter $n = 1.51823$, Filter
$d_9 = 54.37$
$d_{10} = 6.25$, $n_5 = 1.52682$, $\nu d = 51.1$
$d_{11} = 31.56$, $n_6 = 1.5200$, $\nu d = 70.1$
$d_{12} = 0.625$
$d_{13} = 31.25$, $n_7 = 1.5200$, $\nu d = 70.1$
$d_{14} = 5.63$, $n_8 = 1.7552$, $\nu d = 27.5$ The spherical aberration and sine condition in the above Example are shown in FIG. 2 (A), and the astigmatism and distortional aberration are shown in FIGS. 2 (B) and 2 (C), respectively.

Example II

Focal Length $f=100.0$, Angle of field 180°, F/2.8, Back-focus 246.08

Figure 4A:
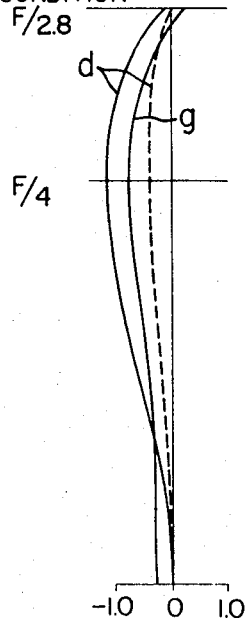
Figure 4B:
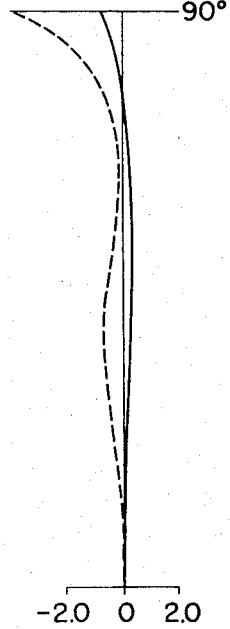
Figure 4C:
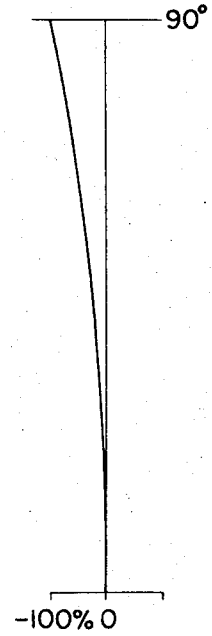

$R_1 = +620.463$
$R_2 = +103.244$
$R_3 = +438.095$
$R_4 = +89.206$
$R_5 = +200.0$
$R_6 = -98.667$
$R_7 = -450.793$
$R_8 = +1666.667$
$R_9 = -79.619$
$R_{10} = +151.111$
$R_{11} = -156.317$
$R_{12} = +506.730$
$R_{13} = -218.876$ $d_1 = 15.873$, $n_1 = 1.62041$, $\nu d = 60.3$
$d_2 = 76.190$
$d_3 = 14.603$, $n_2 = 1.62041$, $\nu d = 60.3$
$d_4 = 86.984$
$d_5 = 53.333$, $n_3 = 1.74950$, $\nu d = 35.0$
$d_6 = 24.126$, $n_4 = 1.64831$, $\nu d = 33.8$
$d_7 = 3.174$
$d_8 = 11.428$, Filter $n = 1.51823$, Filter
$d_9 = 43.809$
$d_{10} = 23.492$, $n_5 = 1.51835$, $\nu d = 60.3$
$d_{11} = 5.714$, $n_6 = 1.74950$, $\nu d = 35.0$
$d_{12} = 26.031$, $n_7 = 1.5200$, $\nu d = 70.1$
$d_{13} = 0.634$
$d_{14} = 17.778$, $n_8 = 1.5168$, $\nu d = 64.2$ The spherical aberration and sine condition in the foregoing Example are shown in FIG. 4 (A), and the astigmatism and distortional aberration are shown in FIGS. 4 (B) and 4 (C), respectively.

Example III

Focal length $f=100.0$, Angle of field 180°, F/2.8 Back-focus 240.33

$R_1 = +620.463$
$R_2 = +103.244$
$R_3 = +400.190$
$R_4 = +87.460$
$R_5 = +189.968$
$R_6 = -103.244$
$R_7 = -480.980$
$R_8 = +1666.667$
$R_9 = -75.936$
$R_{10} = +148.571$
$R_{11} = -156.317$
$R_{12} = +506.730$
$R_{13} = -219.993$ $d_1 = 15.873$, $n_1 = 1.62041$, $\nu d = 60.3$
$d_2 = 73.015$
$d_3 = 14.603$, $n_2 = 1.62041$, $\nu d = 60.3$
$d_4 = 90.158$
$d_5 = 53.333$, $n_3 = 1.744$, $\nu d = 44.9$
$d_6 = 23.492$, $n_4 = 1.62041$, $\nu d = 60.3$
$d_7 = 3.174$
$d_8 = 11.428$, Filter $n = 1.51823$, Filter
$d_9 = 42.539$
$d_{10} = 20.952$, $n_5 = 1.51835$, $\nu d = 60.3$
$d_{11} = 5.714$, $n_6 = 1.74950$, $\nu d = 35.0$
$d_{12} = 26.031$, $n_7 = 1.52000$, $\nu d = 70.1$
$d_{13} = 0.634$
$d_{14} = 17.777$, $n_8 = 1.51680$, $\nu d = 64.2$ The spherical aberration and sine condition in this Example are shown in FIG. 5 (A) and the astigmatism and distortional aberration are shown in FIGS. 5 (B) and 5 (C), respectively.

Example IV

Focal length $f=100.0$, Angle of field 160°, F/2.8, Back-focus 240.69

$R_1 = +548.000$
$R_2 = +92.400$
$R_3 = +578.000$
$R_4 = +93.866$
$R_5 = +144.000$
$R_6 = -133.333$
$R_7 = -321.333$ $d_1 = 16.0$, $n_1 = 1.62041$, $\nu d = 60.3$
$d_2 = 70.0$
$d_3 = 11.333$, $n_2 = 1.62041$, $\nu d = 60.3$
$d_4 = 60.667$
$d_5 = 49.333$, $n_3 = 1.57501$, $\nu d = 41.3$
$d_6 = 13.333$, $n_4 = 1.77279$, $\nu d = 49.5$
$d_7 = 3.333$
$d_8 = 12.000$, Filter $n = 1.51823$, Filter
$d_9 = 51.333$ $R_8 = +3333.333$
$R_9 = +200.000$
$R_{10} = -180.000$
$R_{11} = +520.000$
$R_{12} = -83.333$
$R_{13} = -212.057$

| | | |
|---|---|---|
| $d_{10} = 6.666$ | $n_5 = 1.52682$ | $\nu d = 51.1$ |
| $d_{11} = 33.333$ | $n_6 = 1.52000$ | $\nu d = 70.1$ |
| $d_{12} = 0.666$ | | |
| $d_{13} = 33.333$ | $n_7 = 1.52000$ | $\nu d = 70.1$ |
| $d_{14} = 3.333$ | $n_8 = 1.75520$ | $\nu d = 27.5$ |

The spherical aberration and sine condition in the above Example are shown in FIG. 6 (A) and the astigmatism and distortional aberration are shown in FIGS. 6 (B) and 6 (C), respectively.

It will thus be appreciated that the present invention can provide a compact, bright fisheye lens system having a long back-focus two to three times the total focal length thereof.

I claim:

1. A fisheye lens system comprising, as viewed in the direction from the object to the image, first and second negative meniscus lenses both convex to the object side, a third lens which is biconvex, a fourth lens which is a negative meniscus lens cemented to the third lens, fifth and sixth lenses and seventh and eighth lenses are cemented together, respectively, an aperture stop interposed between the fourth and fifth lenses, and a filter interposed between the fourth lens and the aperture stop, the lens system satisfying the following conditions:

Focal length $f = 100.0$, Angle of field 180°, F/2.8, Back-focus 237.38

$R_1 = +581.25$
$R_2 = +92.375$
$R_3 = +546.875$
$R_4 = +95.625$
$R_5 = +143.75$
$R_6 = -133.313$
$R_7 = -321.313$ $R_8 = +3312.5$
$R_9 = +200.0$
$R_{10} = -173.75$
$R_{11} = +577.688$
$R_{12} = -80.625$
$R_{13} = -204.319$

| | | |
|---|---|---|
| $d_1 = 17.5$ | $n_1 = 1.62041$ | $\nu d = 60.3$ |
| $d_2 = 70.0$ | | |
| $d_3 = 11.25$ | $n_2 = 1.62041$ | $\nu d = 60.3$ |
| $d_4 = 60.63$ | | |
| $d_5 = 45.62$ | $n_3 = 1.57501$ | $\nu d = 41.3$ |
| $d_6 = 10.0$ | $n_4 = 1.77279$ | $\nu d = 49.5$ |
| $d_7 = 3.13$ | | |
| $d_8 = 11.25$ | Filter $n = 1.51823$ | Filter |
| $d_9 = 54.37$ | | |
| $d_{10} = 6.25$ | $n_5 = 1.52682$ | $\nu d = 51.1$ |
| $d_{11} = 31.56$ | $n_6 = 1.5200$ | $\nu d = 70.1$ |
| $d_{12} = 0.625$ | | |
| $d_{13} = 31.25$ | $n_7 = 1.5200$ | $\nu d = 70.1$ |
| $d_{14} = 5.63$ | $n_8 = 1.7552$ | $\nu d = 27.5$ | where $R$ represents the radius of curvature, $d$ the intervertex distance, $n$ the refractive index, and $\nu_d$ the dispersive power.

2. A fisheye lens system comprising, as viewed in the direction from the object to the image, first and second negative meniscus lenses both convex to the object side, a third lens which is biconvex, a fourth lens which is a negative meniscus lens cemented to the third lens, fifth, sixth and seventh lenses are cemented together, an eighth lens which is biconvex, an aperture stop interposed between the fourth and fifth lenses, and a filter interposed between the fourth lens and the aperture stop, the lens system satisfying the following conditions:

Focal length $f = 100.0$, Angle of field 180°, F/2.8, Back-focus 246.08

$R_1 = +620.463$
$R_2 = +103.244$
$R_3 = +438.095$
$R_4 = +89.206$
$R_5 = +200.0$
$R_6 = -98.667$
$R_7 = -450.793$ $R_8 = +1666.667$
$R_9 = -79.619$
$R_{10} = +151.111$
$R_{11} = -156.317$
$R_{12} = +506.730$
$R_{13} = -218.876$

| | | |
|---|---|---|
| $d_1 = 15.873$ | $n_1 = 1.62041$ | $\nu_d = 60.3$ |
| $d_2 = 76.190$ | | |
| $d_3 = 14.603$ | $n_2 = 1.62041$ | $\nu_d = 60.3$ |
| $d_4 = 86.984$ | | |
| $d_5 = 53.333$ | $n_3 = 1.74950$ | $\nu_d = 35.0$ |
| $d_6 = 24.126$ | $n_4 = 1.64831$ | $\nu_d = 33.8$ |
| $d_7 = 3.174$ | | |
| $d_8 = 11.428$ | Filter $n = 1.51823$ | Filter |
| $d_9 = 43.809$ | | |
| $d_{10} = 23.492$ | $n_5 = 1.51835$ | $\nu_d = 60.3$ |
| $d_{11} = 5.714$ | $n_6 = 1.74950$ | $\nu_d = 35.0$ |
| $d_{12} = 26.031$ | $n_7 = 1.5200$ | $\nu_d = 70.1$ |
| $d_{13} = 0.634$ | | |
| $d_{14} = 17.778$ | $n = 1.5168$ | $\nu_d = 64.2$ | where $R$ represents the radius of curvature, $d$ the intervertex distance, $n$ the refractive index, and $\nu_d$ the dispersive power.

3. A fisheye lens system comprising, as viewed in the direction from the object to the image, first and second negative meniscus lenses both convex to the object side, a third lens which is biconvex, a fourth lens which is a negative meniscus lens cemented to the third lens, fifth, sixth and seventh lenses are cemented together, an eighth lens which is biconvex, an aperture stop interposed between the fourth and fifth lenses, and a filter interposed between the fourth lens and the aperture stop, in which the lens system satisfies the following conditions:

Focal length $f = 100.0$, Angle of field 180°, F/2.8, Back-focus 240.33

$R_1 = +620.463$
$R_2 = +103.244$
$R_3 = +400.190$
$R_4 = +87.460$
$R_5 = +189.968$
$R_6 = -103.244$
$R_7 = -481.980$ $R_8 = +1666.667$
$R_9 = -75.936$
$R_{10} = +148.571$
$R_{11} = -156.317$
$R_{12} = +506.730$
$R_{13} = -219.993$

| | | |
|---|---|---|
| $d_1 = 15.873$ | $n_1 = 1.62041$ | $\nu_d = 60.3$ |
| $d_2 = 73.015$ | | |
| $d_3 = 14.603$ | $n_2 = 1.62041$ | $\nu_d = 60.3$ |
| $d_4 = 90.158$ | | |
| $d_5 = 53.333$ | $n_3 = 1.744$ | $\nu_d = 44.9$ |
| $d_6 = 23.492$ | $n_4 = 1.62041$ | $\nu_d = 60.3$ |
| $d_7 = 3.174$ | | |
| $d_8 = 11.428$ | Filter $n = 1.51823$ | Filter |
| $d_9 = 42.539$ | | |
| $d_{10} = 20.952$ | $n_5 = 1.51835$ | $\nu_d = 60.3$ |
| $d_{11} = 5.714$ | $n_6 = 1.74950$ | $\nu_d = 35.0$ |
| $d_{12} = 26.031$ | $n_7 = 1.52000$ | $\nu_d = 70.1$ |
| $d_{13} = 0.634$ | | |
| $d_{14} = 17.777$ | $n_8 = 1.51680$ | $\nu_d = 64.2$ | where $R$ represents the radius of curvature, $d$ the intervertex distance, $n$ the refractive index, and $\nu_d$ the dispersive power.

4. A fisheye lens system comprising, as viewed in the direction from the object to the image, first and second negative meniscus lenses both convex to the object side, a third lens which is biconvex, a fourth lens which is a negative meniscus lens, fifth and sixth lenses and seventh and eighth lenses are cemented together, respectively, an aperture stop interposed between the fourth and fifth lenses and a filter interposed between the fourth lens and the aperture stop, in which the lens system satisfied the following conditions:

Focal length $f = 100.0$, Angle of field 160°, F/2.8, Back-focus 240.69

$R_1 = +548.000$
$\quad d_1 = 16.0 \quad n_1 = 1.62041 \quad \nu_d = 60.3$
$R_2 = +92.400$
$\quad d_2 = 70.0$
$R_3 = +578.000$
$\quad d_3 = 11.333 \quad n_2 = 1.62041 \quad \nu_d = 60.3$
$R_4 = +93.866$
$\quad d_4 = 60.667$
$R_5 = +144.000$
$\quad d_5 = 49.333 \quad n_3 = 1.57501 \quad \nu_d = 41.3$
$R_6 = -133.333$
$\quad d_6 = 13.333 \quad n_4 = 1.77279 \quad \nu_d = 49.5$
$R_7 = -321.333$
$\quad d_7 = 3.333$
$\quad d_8 = 12.000 \quad$ Filter $n = 1.51823 \quad$ Filter
$\quad d_9 = 51.333$
$R_8 = +3333.333$
$\quad d_{10} = 6.666 \quad n_5 = 1.52682 \quad \nu_d = 51.1$
$R_9 = +200.000$
$\quad d_{11} = 33.333 \quad n_6 = 1.52000 \quad \nu_d = 70.1$
$R_{10} = -180.000$
$\quad d_{12} = 0.666$
$R_{11} = +520.000$
$\quad d_{13} = 33.333 \quad n_7 = 1.52000 \quad \nu_d = 70.1$
$R_{12} = -83.333$
$\quad d_{14} = 3.333 \quad n_8 = 1.75520 \quad \nu_d = 27.5$
$R_{13} = -212.057$ where $R$ represents the radius of curvature, $d$ the inter-vertex distance, $n$ the refractive index, and $\nu_d$ the dispersive power.

* * * * *